(12) United States Patent
Aoki et al.

(10) Patent No.: US 6,424,059 B1
(45) Date of Patent: Jul. 23, 2002

(54) GAS INSULATED SWITCHING DEVICE

(75) Inventors: Hirohide Aoki; Yasuhiro Maeda; Mitsuo Matsumoto; Hiroyuki Hama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 29 days.

(21) Appl. No.: 09/611,130

(22) Filed: Jul. 6, 2000

(30) Foreign Application Priority Data

Dec. 27, 1999 (JP) .......................................... 11-368756

(51) Int. Cl.[7] .............................................. H02B 13/45
(52) U.S. Cl. ...................................... 307/118; 307/149
(58) Field of Search ................................. 307/116, 118, 307/131, 147, 149

(56) References Cited

U.S. PATENT DOCUMENTS

| 3,959,761 A | 5/1976 | Graul |
| 5,272,460 A | 12/1993 | Baumgartner et al. |
| 5,901,034 A | * 5/1999 | Fuglister .................... 361/641 |
| 5,917,316 A | * 6/1999 | Bosco et al. ................ 324/126 |
| 5,939,876 A | 8/1999 | Fuglister et al. |

FOREIGN PATENT DOCUMENTS

| EP | 650 236 | 4/1995 | |
| EP | 838 686 | 4/1998 | |
| EP | 0933639 A2 * | 8/1999 | .......... G01R/15/18 |
| JP | 5-251251 | 9/1993 | |
| JP | 2001-186611 | * 7/2001 | .......... H02B/13/02 |

* cited by examiner

*Primary Examiner*—Fritz Fleming
(74) *Attorney, Agent, or Firm*—Sughrue Mion, PLLC (57) ABSTRACT

A gas insulated switching device including a series of pressure containers 1 and 4 mutually connected, in which a conductor 2 is positioned in an inside center, and an insulating and arc-extinguishing gas is filled in a space around the conductor 2, and a current transformer fabricated by Rogowskii coils for detecting a current passing through the conductor 2, the current transformer is attached to flanges of the pressure containers 1 and 4 via a metallic adaptor 5, wherein the current transformer is accommodated in a groove formed toward an inside of the metallic adaptor 5 and uses the metallic adaptor 5 to obtain an earth potential, whereby the gas insulated switching device having the current transformer with high accuracy can be miniaturized.

16 Claims, 7 Drawing Sheets

GAS INSULATED SWITCHING DEVICE

BACKGROUND OF THE INVENTION

1. Field of the Invention

The present invention relates to a gas insulated switching device transforming an electrical energy in a power system, particularly to installation of a current transformer.

2. Discussion of Background

A gas insulated switching device, used in a field of generating and transforming an electric power in a power system, is constructed by a switching device, a conductor, a current transformer, a surging arrester, and so on, which are accommodated in a metallic pressure container, filled with an arc-extinguishing gas such as a sulfur hexafluoride (hereinbelow referred to as $SF_6$ gas) having excellent insulating capability and excellent arc-extinguishing capability, and these switching device, the conductor, the current transformer, the surging arrester, and so on are mutually connected, whereby the gas insulated switching device has been small-sized. However, further improvement in economy is required by reducing a space occupied by the gas insulated switching device by virtue of miniaturization and improvement in reliability of component obtained as a result of a recent technology development.

Figure 7:
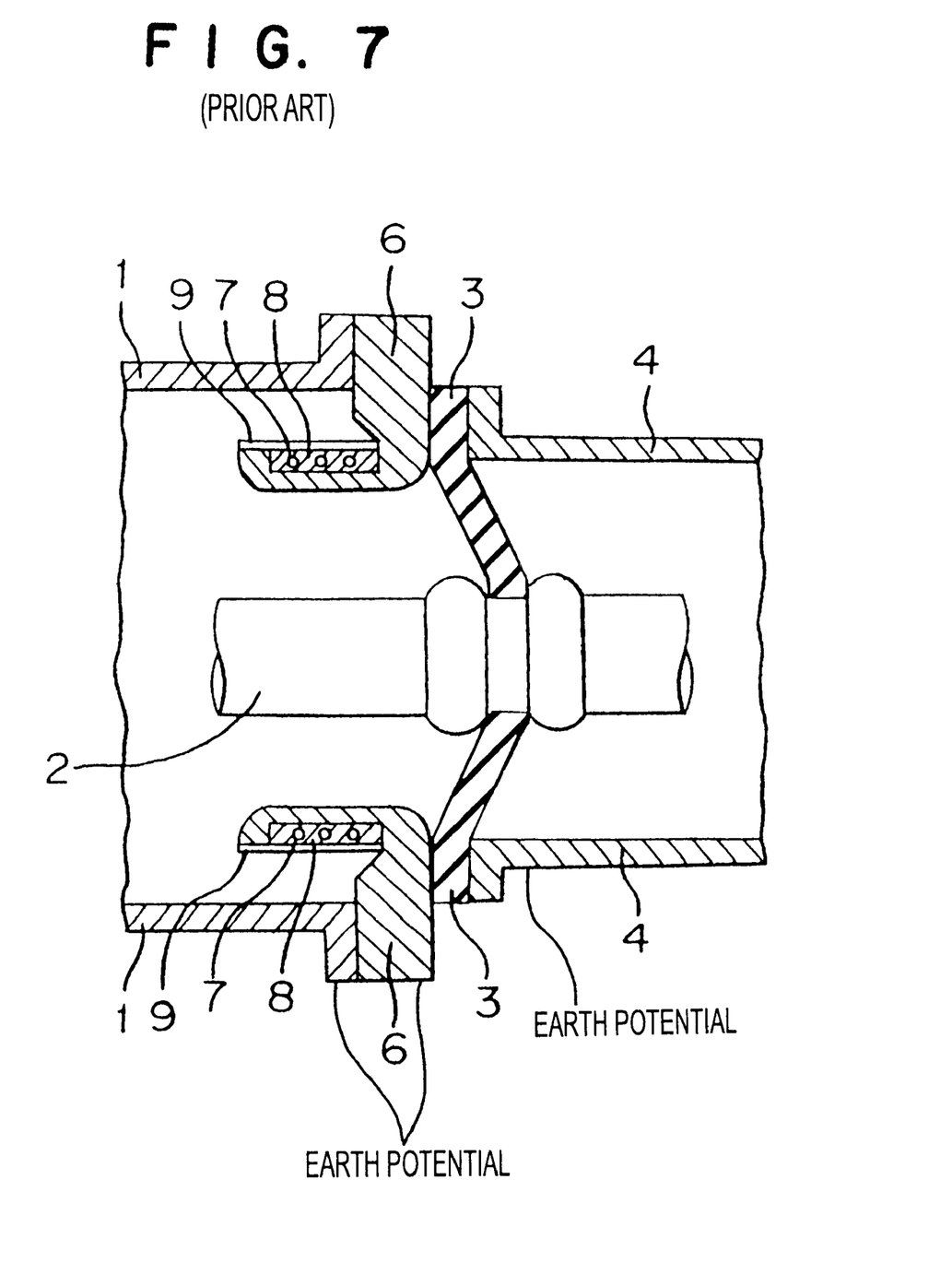
FIG. 7 is a cross-sectional view illustrating a current transformer of a conventional gas insulated switching device.

FIG. 7 is a cross-sectional view illustrating a conventional current transformer. In FIG. 7, numerical references 1, 4 designate a pressure container, in which a conductor 2 is accommodated in a center thereof and an $SF_6$ gas is filled. Numerical reference 3 designates an insulating spacer for supporting the conductor 2 and separating the gas in the pressure container 1 from the gas in the other pressure container 4, connected to a pressure container 1. Numerical reference 6 designates a current transformer holder attached to flanges of the pressure containers 1 and 4 via an insulating spacer 3, the current transformer holder includes a cylindrical portion having grooves like a ring and an attaching flange corresponding to the flanges of the pressure containers 1 and 4. Numerical reference 7 designates a plurality of Rogowskii coils, positioned in the groove like the ring in the current transformer holder 6 via a spacer 8 in an axial direction of the pressure container 1. Numerical reference 9 designates a fixing plate for fixing the Rogowskii coils 7 inside the groove. A current transforming portion is constructed by the current transformer holder 6, the Rogowskii coils 7, the spacer 8, and the fixing plate 9 for detecting a current applied to the conductor 2. The Rogowskii coils 7 is formed by uniformly wind a coil around a high molecular member, being flexible and having a circular cross sectional view or the like by many turns, wherein the Rogowskii coils work as a current sensor, from which a current signal is obtainable in proportion to a current value, flowing inside the Rogowskii coils 7.

However, since the Rogowskii coils 7 forming the current transformer are flexible, hollow portions of the Rogowskii coils are deformed by a pressure applied to surfaces of the Rogowskii coils at time of attaching these to the current transformer holder 6, whereby an accuracy of detecting a current is deteriorated.

Further, since the Rogowskii coils 7 are attached to the current transformer holder 6 having protrusions in the axial directions of the pressure container 1, for example, in case that a breaker container containing a breaker and so on are connected, the protrusion of the current transformer holder 6 insufficiently protrudes inside the breaker container, whereby the length of the pressure container 1 should be increased, and a miniaturization of an entirety of the switching device is difficult.

Further, although it is necessary to sufficiently keep an insulating distance between the Rogowskii coils and the conductor 2, the current transformer holder 6 also protrudes in a radial direction of the pressure container 1, whereby the diameter of the pressure container is increased, miniaturization of the entire switching device is difficult.

SUMMARY OF THE INVENTION

It is an object of the present invention to solve the above-mentioned problems inherent in the conventional technique and to provide a gas insulated switching device, in which a highly accurate current transformer is equipped for miniaturizing the gas insulated switching device.

According to a first aspect of the present invention, there is provided a gas insulated switching device comprising a mutually connected series of containers having a conductor in a center and filled with an insulating and arc-extinguishing gas around the conductor; and a current transformer including Rogowskii coils for detecting a current flowing through the conductor, the current transformer is attached to a flange of the pressure containers through an annular metallic adaptor, wherein the current transformer is accommodated in grooves formed toward an inside of a metallic adaptor and uses the metallic adaptor to obtain an earth potential.

According to a second aspect of the present invention, there is provided a gas insulated switching device, wherein the Rogowskii coils of the current transformer is formed by uniformly winding a coil around an inflexible insulating member by many turns.

According to a third aspect of the present invention, there is provided a gas insulated switching device, wherein the metallic adaptor is attached via an insulating spacer for separating the gas in the mutually connected series containers, and a rounded portion is formed on an inner peripheral surface on a side, being in contact with the insulating spacer for relaxing an electric field in a triple junction among the insulating and arc-extinguishing gas filled in the pressure containers, the insulating spacer, and the metallic adaptor.

According to a fourth aspect of the present invention, there is provided a gas insulated switching device, wherein a flange of the pressure containers is the metallic adaptor.

According to a fifth aspect of the present invention, there is provided a gas insulated switching device, wherein a current detector for measuring the current, detected by the current converter, is located on an outer periphery of the metallic adaptor.

According to a sixth aspect of the present invention, there is provided a gas insulated switching device, wherein the current transformer includes Rogowskii coils for detecting a current passing through the conductor, which are attached to a breaker in a breaker container being adjacent to and connected to the series of pressure containers through an angular metallic adaptor located in an outer periphery of the conductor connected to the breaker, and the current transformer is accommodated in a groove formed in the metallic adaptor toward an inside thereof, and uses the metallic adaptor to obtain an earth potential.

According to a seventh aspect of the present invention, there is provided the gas insulated switching device, wherein a plurality of Rogowskii coils having same dimensions are arranged side by side in the metallic adaptor in an axial direction of the pressure containers around a common axis center of the Rogowskii coils.

According to an eighth aspect a gas insulated switching device according to the present invention is that a plurality of Rogowskii coils having same dimensions in an axial direction of a cross section of the coils and different dimensions in radial directions of the coils are arranged in radial directions of the pressure containers so as to be concentrically piled up.

According to a ninth aspect of the present invention, there is provided a gas insulated switching device wherein the Rogowskii coils is attached to the metallic adaptor by monolithically molding with a flexible resin inside the metallic adaptor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 6b as follows, wherein the same numerical references are used for the same or similar portions and description of these portions is omitted.

Embodiment 1

Figure 1A:
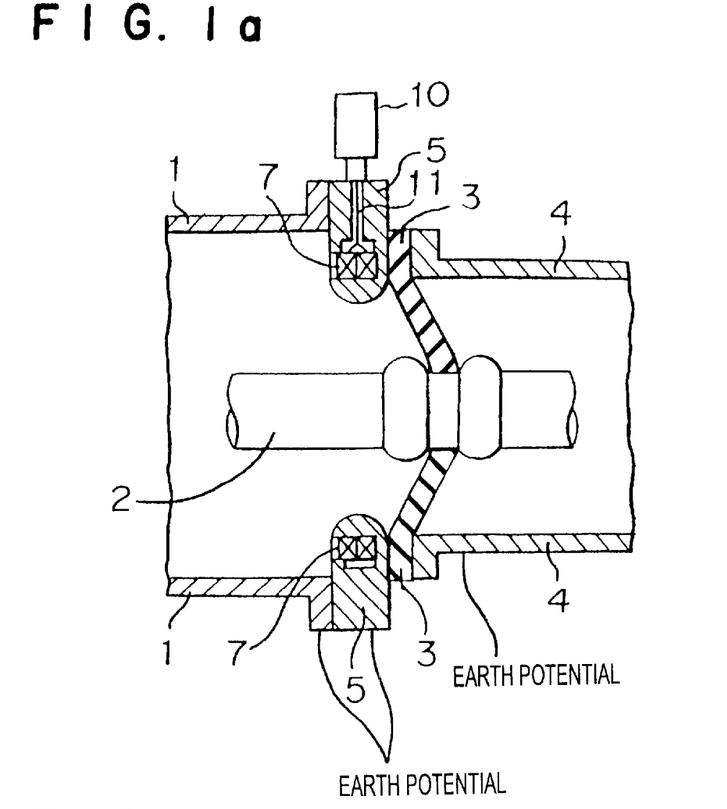
FIG. 1a is a cross-sectional view of a current transformer of a gas insulated switching device according to Embodiment 1 of the present invention.
Figure 1B:
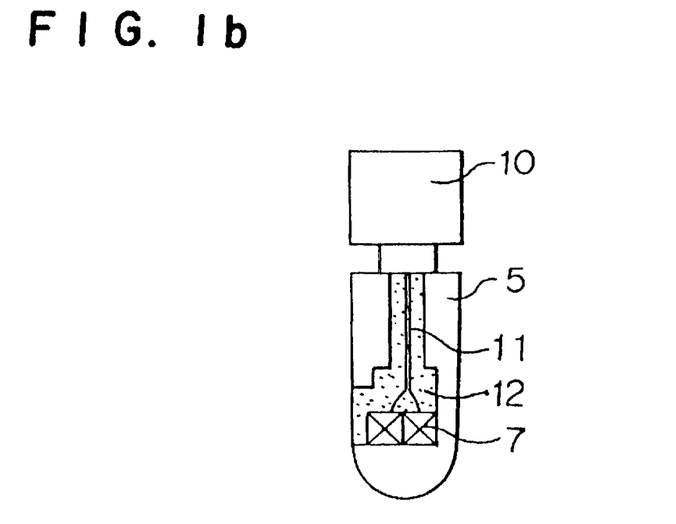
FIG. 1b is an enlarged view illustrating the current transformer of the gas insulated switching device according to Embodiment 1 of the present invention.

FIG. 1a is a cross-sectional view illustrating a current transformer of a gas insulated switching device according to Embodiment 1 of the present invention. FIG. 1b is an enlarged view of the current transformer. In FIGS. 1a and 1b, numerical references 1 and 4 designate pressure containers filled with a $SF_6$ gas, wherein a conductor 2 is accommodated in a center of the pressure containers. Numerical reference 3 designates an insulating spacer for supporting the conductor 2 and separating the gas in the pressure container 1 and the other pressure container 4 connected thereto. Numerical reference 5 designates an annular metallic adaptor attached to flanges of the pressure containers 1 and 4 via the insulating spacer 3. Numerical reference 7 designates a plurality of Rogowskii coils arranged in a groove formed in the metallic adaptor 5. Numerical reference 10 designates a current detector measuring a current detected by the current transformer including the Rogowskii coils. Numerical reference 11 designates a lead wire for connecting the Rogowskii coils 7 with the current detector 10. Numerical reference 12 designates a resin having flexibility, by which the metallic adaptor 5 and the Rogowskii coils 7 are monolithically molded. The current transformer is fabricated by the metallic adaptor 5, the Rogowskii coils 7, the current detector 10, and the lead wire 11 for detecting a current passing through the conductor 2.

Differences between Embodiment 1 and the conventional technique is that, first, a current transformer holder in the conventional technique is changed to the metallic adaptor 5. The metallic adaptor 5 according to Embodiment 1 has the groove inside a body of the metallic adaptor 5. The Rogowskii coils 7 are accommodated in the groove, wherein a plurality of the Rogowskii coils 7 having same diameters are arranged side by side in an axial direction of the pressure container 1 around same axis centers, wherein two Rogowskii coils are exemplified in FIGS. 1a and 1b.

The metallic adaptor 5 is attached to the flanges of the pressure containers 1 and 4 in a similar manner to that in the conventional technique. The current detector 10 is attached to an outer periphery of the metallic adaptor 5, which is connected to the Rogowskii coils 7 through a lead wire 11. Further, a rounded portion is formed in an inner diameter of the metallic adaptor 5 on a side in contact with the insulating spacer 3. The rounded portion is to relax an electric field in a triple junction among the insulating and arc-extinguishing gas filled in the pressure containers 1 and 4, the insulating spacer 3, and the metallic adaptor 5.

Second, although in a conventional technique the coil having many turns is uniformly wound around the insulating member having flexibility, an inflexible insulating member is used for the Rogowskii coils 7 in Embodiment 1. A material of the Rogowskii coils 7 is an epoxy laminating resin with a glass fabric base, a phenol laminating resin with a paper base, FRP and so on.

On the other hand, the Rogowskii coils are monolithically molded by the resin having flexibility inside the groove of the metallic adaptor 5. By monolithically molding the Rogowskii coils, it is possible to obtain the current transformer, which can be easily operated and simply installed, at a low cost. A method of monolithically molding the Rogowskii coils 7 is injection of a silicon system resin, an epoxy system resin, a butyl system resin, and so on respectively having excellent anti-arced gas property. Further, it is possible to apply a conventional method of producing the Rogowskii coils such that a resin is impregnated after winding an insulating tape.

As described, according to Embodiment 1, since the Rogowskii coils 7 are arranged in the groove of the metallic adaptor 5 without protruding portions, it is possible to prevent sizes in the axial and radial directions of the pressure container 1 from increasing, and an entire size of the switching device can be miniaturized.

Further, since the Rogowskii coils 7 is obtained by winding the coil around the insulating member without flexibility, it is possible to suppress deformation of hollow portions of the Rogowskii coils 7, and the current can be detected with high accuracy.

Embodiment 2

Figure 2:
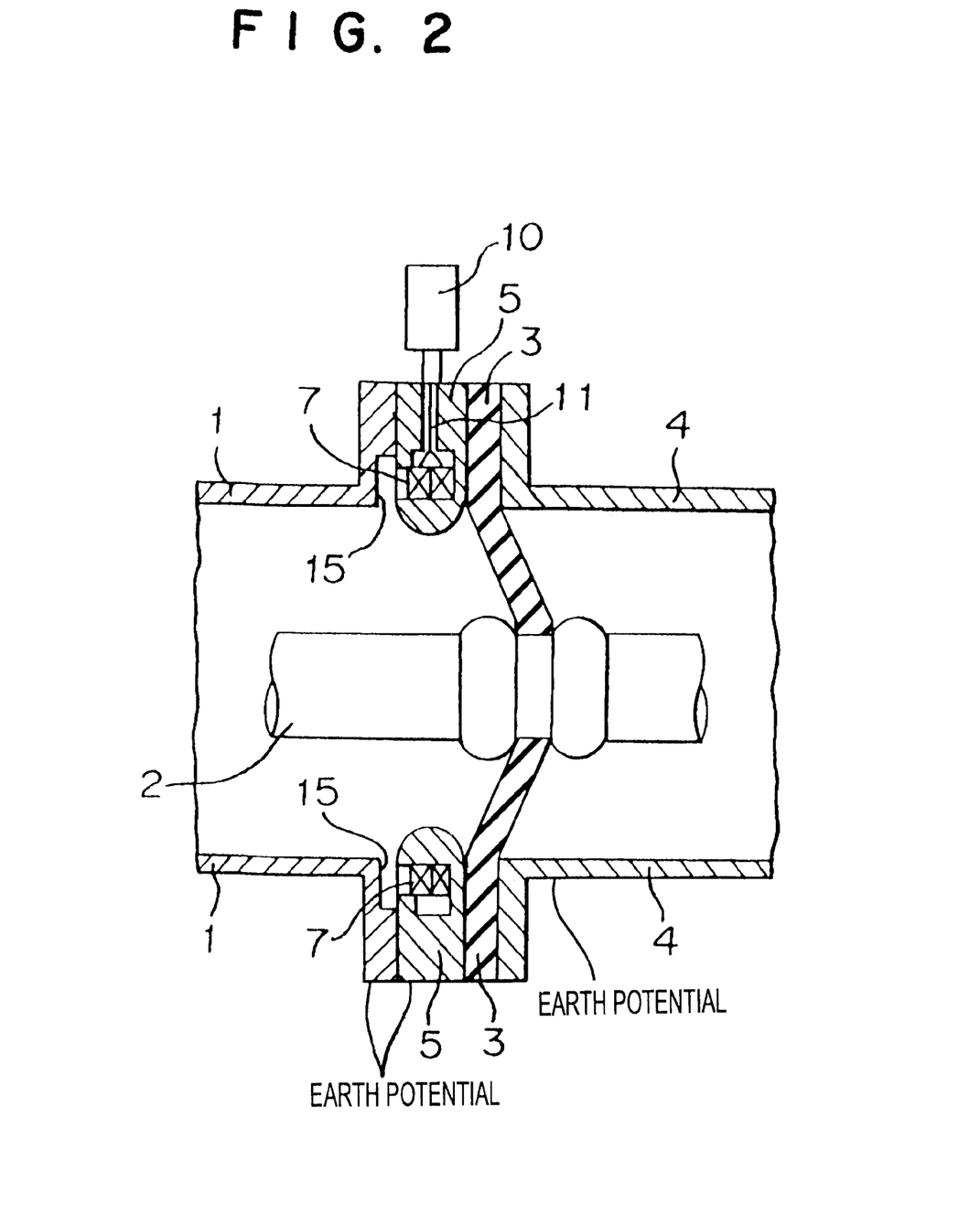
FIG. 2 is a cross-sectional view illustrating a current transformer of a gas insulated switching device according to Embodiment 2 of the present invention.

FIG. 2 is a cross-sectional view illustrating a current transformer of a gas insulated switching device according to Embodiment 2 of the present invention. A difference from Embodiment 1 is that a flange of a pressure container 1 overlaps a groove accommodating the Rogowskii coil because the pressure container 1 and a pressure container 4 have same diameters. Therefore, a cut-out 15 is formed in the flange of the pressure container 1 so as not to clog an opening portion of the groove. Accordingly, it is possible to obtain an effect of matching the diameter of the pressure container 1 with the diameter of the pressure container 4 and making the diameters of the pressure containers 1 and 4 small.

Embodiment 3

Figure 3:
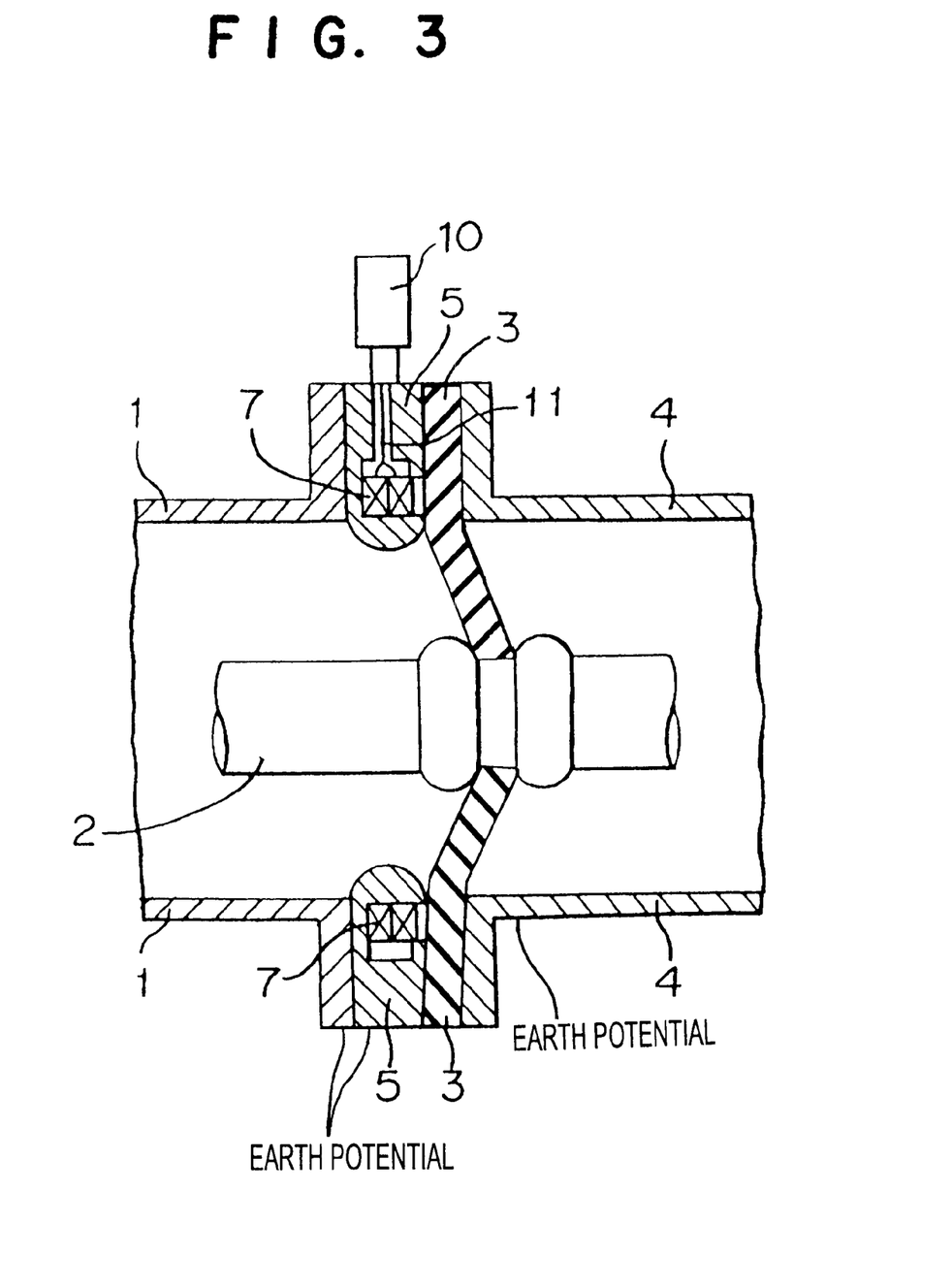
FIG. 3 is a cross-sectional view of a current transformer of a gas insulated switching device according to Embodiment 3 of the present invention.

FIG. 3 is a cross-sectional view illustrating a current transformer of a gas insulated switching device according to Embodiment 3 of the present invention. In Embodiment 3, an opening portion of a groove in a metallic adaptor 5 is formed to face a side of an insulating spacer 3. Therefore, as in Embodiment 2, it is unnecessary to form a cut-out in a flange of a pressure container, and processing of the flange of the pressure container 1 is simplified, whereby an effect of producing at a low cost is obtainable.

Embodiment 4

Figure 4:
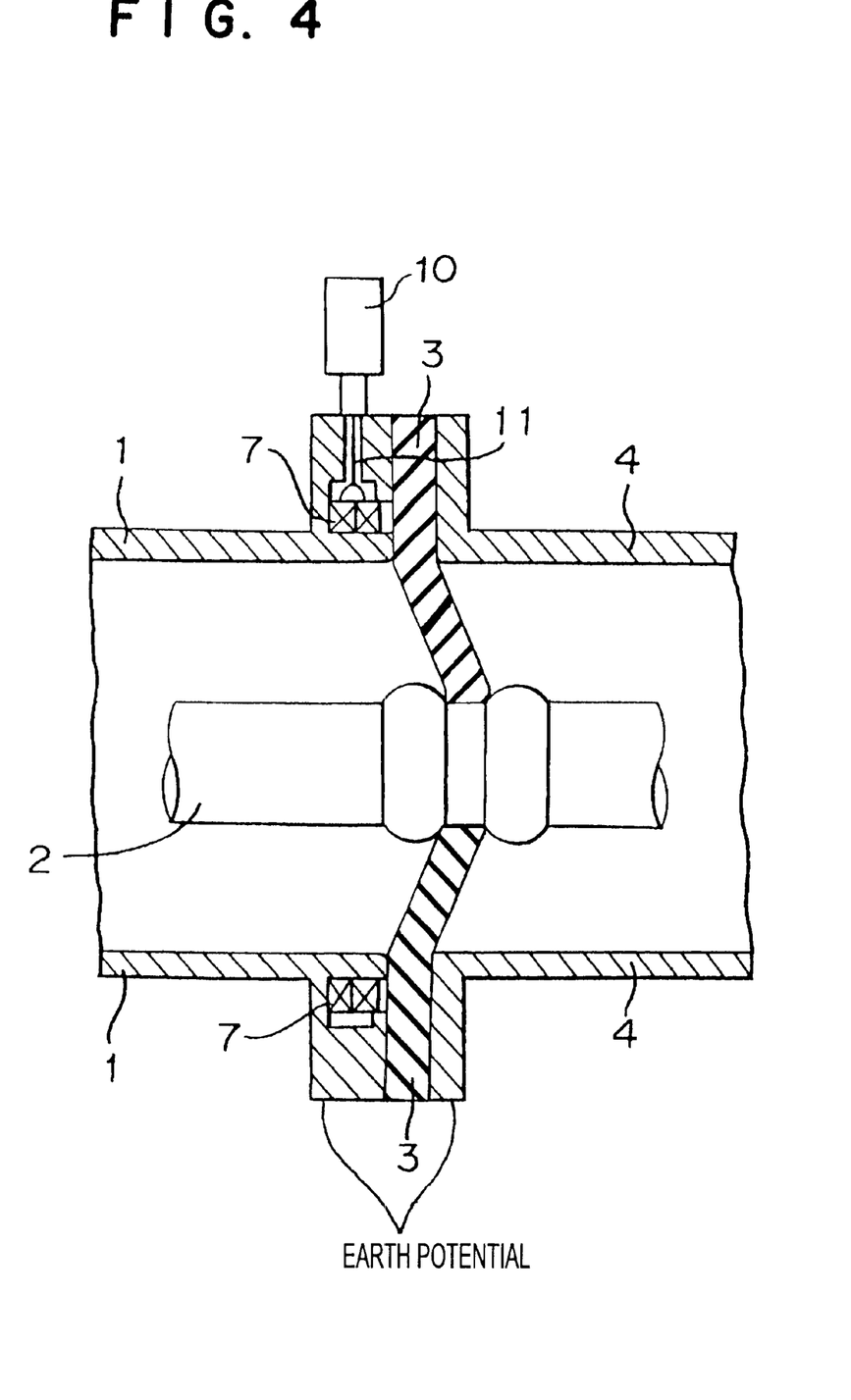
FIG. 4 is a cross-sectional view illustrating a current transformer of a gas insulated switching device according to Embodiment 4 of the present invention.

FIG. 4 is a cross-sectional view illustrating a current transformer of a gas insulated switching device according to Embodiment 4. In embodiment 4, flanges of a pressure container 1 and a metallic adaptor 5 are identical. Therefore, it is unnecessary to use the metallic adaptor 5, a dimension of the pressure container 1 in its axial direction is reduced, and a body of the switching device is miniaturized.

Embodiment 5

Figure 5:
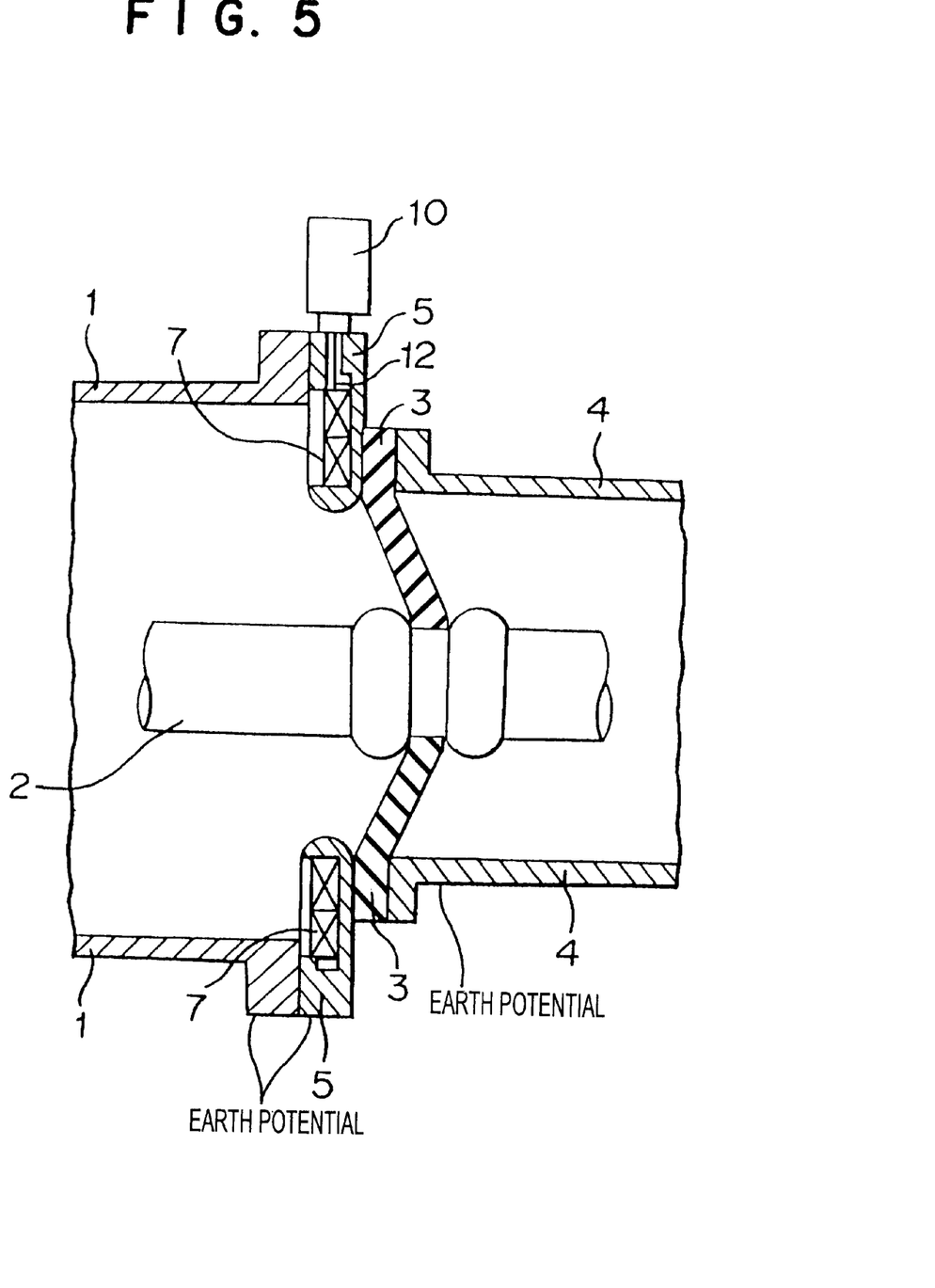
FIG. 5 is a cross-sectional view illustrating a current transformer of a gas insulated switching device according to Embodiment 5 of the present invention.

FIG. 5 is a cross-sectional view illustrating a current transformer of a gas insulated switching device according to Embodiment 5 of the present invention. In Embodiment 5, two Rogowskii coils 7 having same dimensions in an axial direction of a pressure container 1 and different dimensions in radial directions are concentrically arranged in a groove of a metallic adaptor 5. Therefore, the width of the metallic adaptor 5 in the axial direction is shortened to make a dimension of an entirety of the gas insulated switching device in its axial direction short, whereby the device is miniaturized.

Further, in Embodiment 5, a case that the Rogowskii coils having the same dimensions in the axial direction of the pressure container 1 and different dimensions in the radial direction are concentrically arranged in the groove of the metallic adaptor 5, such a structure can be respectively applied to the above-mentioned embodiments.

Embodiment 6

Figure 6A:
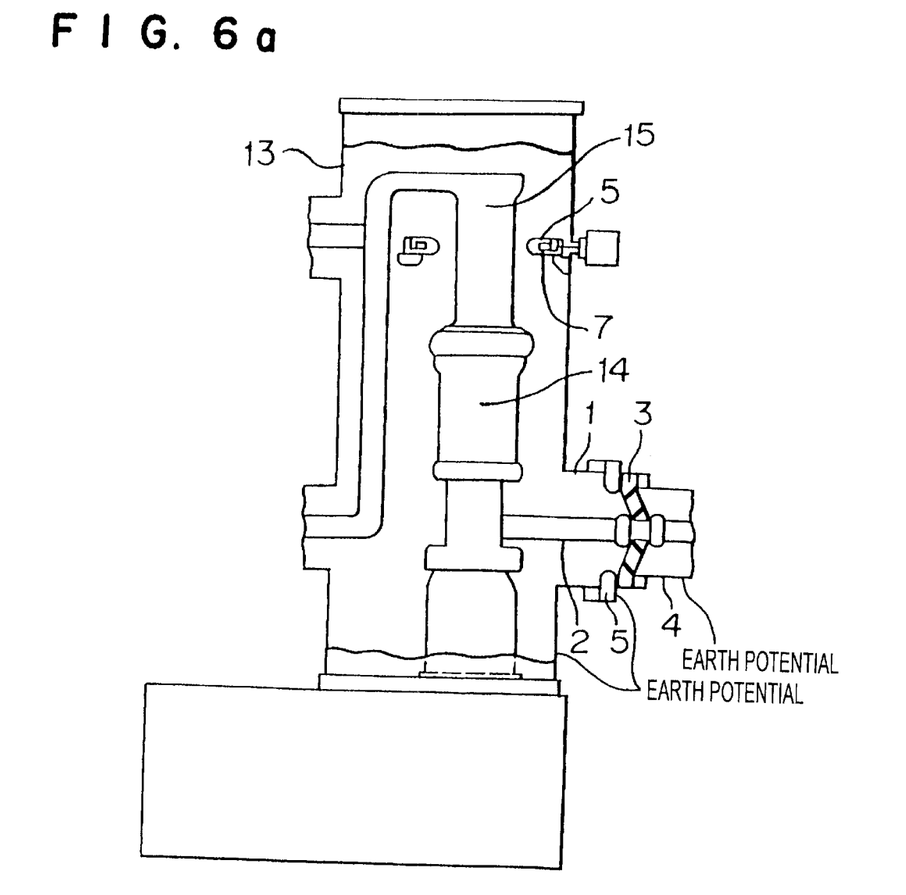
FIG. 6a is a cross-sectional view of a breaker container of a gas insulated switching device according to Embodiment 6 of the present invention.
Figure 6B:
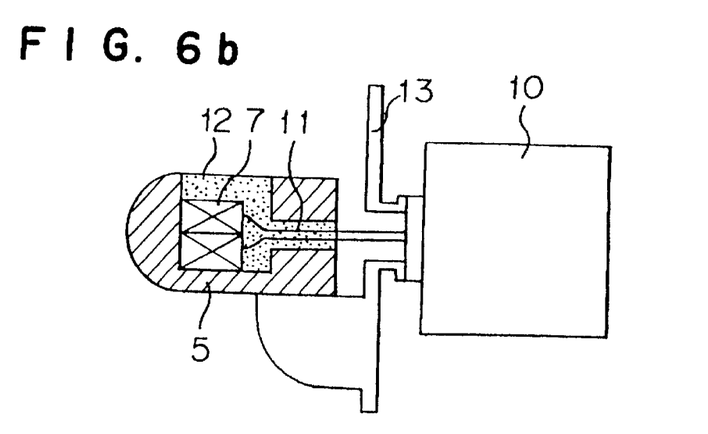
FIG. 6b is an enlarged view of the breaker container of the gas insulated switching device according to Embodiment 6 of the present invention.

In Embodiment 6, a case that a structure of locating a current transformer in a connecting portion of pressure containers in the above-mentioned embodiments to an inside of a breaker container. FIG. 6a is a cross-sectional view illustrating a breaker container of a gas insulated switching device according to Embodiment 6 of the present invention. FIG. 6b is an enlarged view illustrating a current transformer located inside the breaker container. In FIGS. 6a and 6b, numerical reference 13 designates the breaker container; numerical reference 14 designates the breaker; and numerical reference 15 designates an inner conductor connected to the breaker 14.

As illustrated in FIGS. 6a and 6b, an annular metallic adaptor having a groove is arranged in an outer periphery of the internal conductor 15 around an axis center thereof. In the groove of the metallic adaptor 5, two Rogowskii coils 7 having same diameters are arranged side by side in an axial direction of the metallic adaptor. Although a structure around the metallic adaptor 5 inside the breaker container is similar to that illustrated in FIG. 1, structures respectively described in the above-mentioned embodiments can be applied to Embodiment 6.

Further, in the above-mentioned embodiments, a case that the two Rogowskii coils 7 are used. However, the present invention is not limited to the case, and three or more Rogowskii coils 7 may be used. Further, in FIGS. 1a through 5, an inner diameter of the metallic adaptor 5 may be the same as an inner diameter of the pressure container 1 or less. Further, the gas insulated switching device may be a three-phase-bus and single-phase breaker type, a type that all three phases are simultaneously switched, and an isolated phase type. The breaker illustrated in FIG. 6 is a vertically arranged type. However, the breaker may be a horizontally arranged type.

The first advantage of the gas insulated switching device according to the present invention is that the dimensions of the pressure containers in the axial and radial directions are not increased, and an entire size of the switching device is miniaturized.

The second advantage of the gas insulated switching device according to the present invention is that the hollow portion of the Rogowskii coils can be prevented from deforming, and a current can be detected with high accuracy.

The third advantage of the gas insulated switching device according to the present invention is that an electric field around the triple junction can be relaxed.

The fourth advantage of the gas insulated switching device according to the present invention is that an influence of a surge noise is suppressed, and it is possible to measure with high accuracy and high reliability.

The fifth advantage of the gas insulated switching device according to the present invention is that the dimension of the pressure containers in the axial direction can be shortened, the dimension of the entire gas insulated switching device can be shortened, and therefore the gas insulated switching device is miniaturized.

The sixth advantage of the gas insulated switching device according to the present invention is that the structure of attaching the Rogowskii coils to the metallic adaptor is simplified, and the Rogowskii coils can be produced at a low cost.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application JP11-368756 filed on Dec. 27, 1999 including specification, claims, drawings and summary are incorporated herein by reference in its entirety.

What is claimed is:

1. A gas insulated switching device comprising:
   a series of pressure containers mutually connected having a conductor positioned in an inside center, and having an insulating and arc-extinguishing gas filled in a space around the conductor;

a current transformer fabricated by Rogowskii coils for detecting a current passing through the conductor, and a one-piece annular metallic adaptor that is adapted to attach the current transformer to flanges of the pressure containers, the one-piece annular metallic adaptor having a groove that receives the Rogowskii coils between the flanges of the pressure containers, wherein said groove further receives the current transformer toward an inside of the metallic adaptor and uses the metallic adaptor to obtain an earth potential.

2. The gas insulated switching device according to claim 1, wherein the Rogowskii coils of the current transformer is formed by uniformly winding a coil around an inflexible insulating member by many turns.

3. The gas insulated switching device according to claim 2, further comprising:

an insulating spacer, located between the metallic adaptor and the pressure container, for separating the gas in the series of the pressure containers, and wherein the metallic adaptor includes a rounded portion formed in an inner peripheral surface on a side in contact with the insulating spacer to relax an electric field in a triple junction, formed among the insulating and arc-extinguishing gas filled in the pressure containers, the insulating spacer, and the metallic adaptor.

4. The gas insulated switching device according to claim 2, wherein a flange of the pressure containers is the metallic adaptor.

5. The gas insulated switching device according to claim 2, further comprising:

a current detector for measuring the current detected by the current transformer, wherein the current detector is located on an outer periphery of the metallic adaptor.

6. The gas insulated switching device according to claim 2, further comprising:

a breaker located inside a breaker container, which is closely joined to the series of pressure containers, wherein the current transformer is fabricated by the Rogowskii coils for detecting the current passing through the conductor, connected to the breaker, by attaching the annular metallic adaptor located in the outer periphery of the conductor to the pressure containers, and the current transformer is accommodated in the groove, formed in the metallic adaptor toward an inside of the metallic adaptor, to use the metallic adaptor as an earth potential.

7. The gas insulated switching device according to claim 2, wherein a plurality of the Rogowskii coils having same dimensions are concentrically arranged in the metallic adaptor in an axial direction of the pressure containers.

8. The gas insulated switching device according to claim 2, wherein a plurality of the Rogowskii coils having a same dimension in axial directions in a cross section of the coils and different dimensions in radial directions of the coils are concentrically arranged in radial directions of the pressure containers so as to surround and being surrounded.

9. The gas insulated switching device according to claim 2, wherein the Rogowskii coils are monolithically molded by a flexible resin inside the metallic adaptor.

10. The gas insulated switching device according to claim 1, further comprising:

an insulating spacer, located between the metallic adaptor and the pressure container, for separating the gas in the series of the pressure containers, and wherein the metallic adaptor includes a rounded portion formed in an inner peripheral surface on a side in contact with the insulating spacer to relax an electric field in a triple junction, formed among the insulating and arc-extinguishing gas filled in the pressure containers, the insulating spacer, and the metallic adaptor.

11. The gas insulated switching device according to claim 1, wherein a flange of the pressure containers is the metallic adaptor.

12. The gas insulated switching device according to claim 1, further comprising:

a current detector for measuring the current detected by the current transformer, wherein the current detector is located on an outer periphery of the metallic adaptor.

13. The gas insulated switching device according to claim 1, further comprising:

a breaker located inside a breaker container, which is closely joined to the series of pressure containers, wherein the current transformer is fabricated by the Rogowskii coils for detecting the current passing through the conductor, connected to the breaker, by attaching the annular metallic adaptor located in the outer periphery of the conductor to the pressure containers, and the current transformer is accommodated in the groove, formed in the metallic adaptor toward an inside of the metallic adaptor, to use the metallic adaptor as an earth potential.

14. The gas insulated switching device according to claim 1, wherein a plurality of the Rogowskii coils having same dimensions are concentrically arranged in the metallic adaptor in an axial direction of the pressure containers.

15. The gas insulated switching device according to claim 1, wherein a plurality of the Rogowskii coils having a same dimension in axial directions in a cross section of the coils and different dimensions in radial directions of the coils are concentrically arranged in radial directions of the pressure containers so as to surround and being surrounded.

16. The gas insulated switching device according to claim 1, wherein the Rogowskii coils are monolithically molded by a flexible resin inside the metallic adaptor.

* * * * *